United States Patent [19]
Rosen et al.

[11] Patent Number: 5,971,252
[45] Date of Patent: Oct. 26, 1999

[54] FRICTION STIR WELDING PROCESS TO REPAIR VOIDS IN ALUMINUM ALLOYS

[75] Inventors: Charles D. Rosen, Huntington Beach; Edward Litwinski, Mission Viejo; Juan M. Valdez, Southgate, all of Calif.

[73] Assignee: The Boeing Company, Seal Beach, Calif.

[21] Appl. No.: 09/070,703

[22] Filed: Apr. 30, 1998

[51] Int. Cl.$^6$ .................................................. B23K 20/12
[52] U.S. Cl. ............................................ 228/112.1; 228/119
[58] Field of Search ............................... 228/112.1, 114, 228/119, 170, 171, 2.1; 156/73.5; 29/402.13, 402.16

[56] References Cited

U.S. PATENT DOCUMENTS

| | | | |
|---|---|---|---|
| 3,487,530 | 1/1970 | Ely | 228/119 |
| 4,144,110 | 3/1979 | Luc . | |
| 4,959,241 | 9/1990 | Thomas et al. . | |
| 5,249,727 | 10/1993 | Eberle et al. | 228/119 |
| 5,262,123 | 11/1993 | Thomas et al. . | |
| 5,460,317 | 10/1995 | Thomas et al. . | |
| 5,469,617 | 11/1995 | Thomas et al. . | |
| 5,624,067 | 4/1997 | Harwig et al. . | |

FOREIGN PATENT DOCUMENTS

| | | |
|---|---|---|
| WO 93/10935 | 6/1993 | WIPO . |
| WO 95/26254 | 10/1995 | WIPO . |

OTHER PUBLICATIONS

TWI, "Leading Edge, Friction hydro pillar processing," *Connect*, Jun. 1992, advertising flyer, one page.
TWI, "On trial—a new thick plate joining technique," *Connect*, Apr. 1993, advertising flyer, one page.
Andrews, R.E., et al., TWI, "Repair of Steel Structures by Friction Hydro Pillar Processing (FHPP)—Technology Development—Summary Report," Nov. 1995, 16 pages.
Thomas, W.M., et al., "Emergent Friction Joining Technologies for the Non–ferrous Casting Industry," TWI, BCIRA International Conference, 1996, pp. 30–1 through 30–12.

*Primary Examiner*—Samuel M. Heinrich
*Attorney, Agent, or Firm*—Harry B. Field

[57] ABSTRACT

The present invention provides an in-process method to repair voids in an aluminum alloy, particularly a friction stir weld in an aluminum alloy. For repairing a circular void or an in-process exit hole in a weld, the method includes the steps of fabricating filler material of the same composition or compatible with the parent material into a plug form to be fitted into the void, positioning the plug in the void, and friction stir welding over and through the plug. For repairing a longitudinal void (30), the method includes machining the void area to provide a trough (34) that subsumes the void, fabricating filler metal into a strip form (36) to be fitted into the trough, positioning the strip in the trough, and rewelding the void area by traversing a friction stir welding tool longitudinally through the strip. The method is also applicable for repairing welds made by a fusing welding process or voids in aluminum alloy workpieces themselves.

7 Claims, 3 Drawing Sheets

FRICTION STIR WELDING PROCESS TO REPAIR VOIDS IN ALUMINUM ALLOYS

GOVERNMENT RIGHTS IN THE INVENTION

The U.S. Government has a paid-up license in this invention and the right in limited circumstances to require the patent owner to license others on reasonable terms as provided for by the terms of Contract NCC8-79 awarded by National Aeronautics and Space Administration (NASA).

FIELD OF THE INVENTION

This invention relates to a method for repairing anomalies found in an aluminum alloy and, more particularly, to a method for repairing a friction stir weld in an aluminum alloy.

BACKGROUND OF THE INVENTION

Friction stir welding (FSW) is a relatively new welding process for joining together parts of materials such as metals, plastics, and other materials that will soften and commingle under applied frictional heat to become integrally connected. A detailed description of an FSW apparatus and process may be found in Patent Publications WO 93/10935 and WO 95/26254; and U.S. Pat. No. 5,460,317, all of which are hereby fully incorporated by reference. One of the useful apparatus for FSW is shown in FIGS. 1A and 1B. As shown, two parts, exemplified by plates 10A' and 10B' on a backing plate 12', are aligned so that the edges of the plates to be welded together are held in direct contact. An FSW tool W' has a shoulder 14' at its distal end, and a nonconsumable welding pin 16' extending downward centrally from the shoulder. As the rotating tool W' is brought into contact with the interface between plates 10A' and 10B', the rotating pin 16' is forced into contact with the material of both plates, as shown. The rotation of the pin in the material and rubbing of the shoulder against the upper surface of the material produce a large amount of frictional heating of both the welding tool and the plate interface. This heat softens the material of the plates in the vicinity of the rotating pin and shoulder, causing commingling of material, which, upon hardening, forms a weld. The tool is moved longitudinally along the interface between plates 10A' and 10B', thereby forming an elongate weld along the interface between the plates. The welding tool's shoulder 14' prevents softened material from the plates from escaping upward, and forces the material into the weld joint. When the weld is completed, the welding tool is retracted.

As with any type of welding process, anomalies can occur in friction stir welding. The types of anomalies include circular voids, surface and subsurface longitudinal voids, and in-process exit holes. Circular and longitudinal voids occur due to parameter and size variations associated with friction stir welding, such as variations in length of the tool pin and thickness of the workpieces being welded. In-process exit holes are left from ending a friction stir weld prematurely. FIG. 2 illustrates a typical in-process exit hole 20 left unfilled from retracting welding tool W' before completing a weld along plates 10A' and 10B'. Resuming the welding process by simply welding over an in-process exit hole produces a void in the exit hole area due to lack of sufficient metal in the area. Rewelding over a circular void or a longitudinal void in the same manner also produces a secondary void. A need exists for a method to repair voids found in a friction stir weld without producing a secondary void. In particular, when multiple weld segments are to be used and overlap each other, voids found in the welds must be repaired as they occur, while in the welding mode. Accordingly, a need exists for an in-process method to repair voids in an aluminum alloy, particularly a friction stir weld, which utilizes equipment and fixtures being used for friction stir welding and, thus, does not require any additional tooling. The needed in-process repair method should repair the void without degrading metallurgical and mechanical properties of the material being repaired.

SUMMARY OF THE INVENTION

The present invention provides an in-process method to repair voids in an aluminum alloy, particularly a friction stir weld in an aluminum alloy. Examples of the types of voids that can be repaired in accordance with the present invention include circular voids, surface and subsurface longitudinal voids, and in-process exit holes. For repairing a circular void or an in-process exit hole in a weld, the method includes the steps of fabricating filler material of the same composition or compatible with the parent material into a plug form to be fitted into the void, positioning the plug in the void, and friction stir welding over and through the plug. For repairing a longitudinal void, the method includes machining the void area to provide a trough that subsumes the void, fabricating filler material of the same composition or compatible with the weld into a strip form to be fitted into the trough, positioning the strip in the trough, and rewelding the void area by traversing a friction stir welding tool longitudinally through the strip. In both cases, the resulting repaired weld exhibits sound metallurgical and mechanical properties that are at least the same as those of the original weld. The method is equally useful for repairing other anomalies found in an aluminum alloy, such as repairing a weld produced by fusion welding or repairing anomalies in aluminum workpieces themselves.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1A:
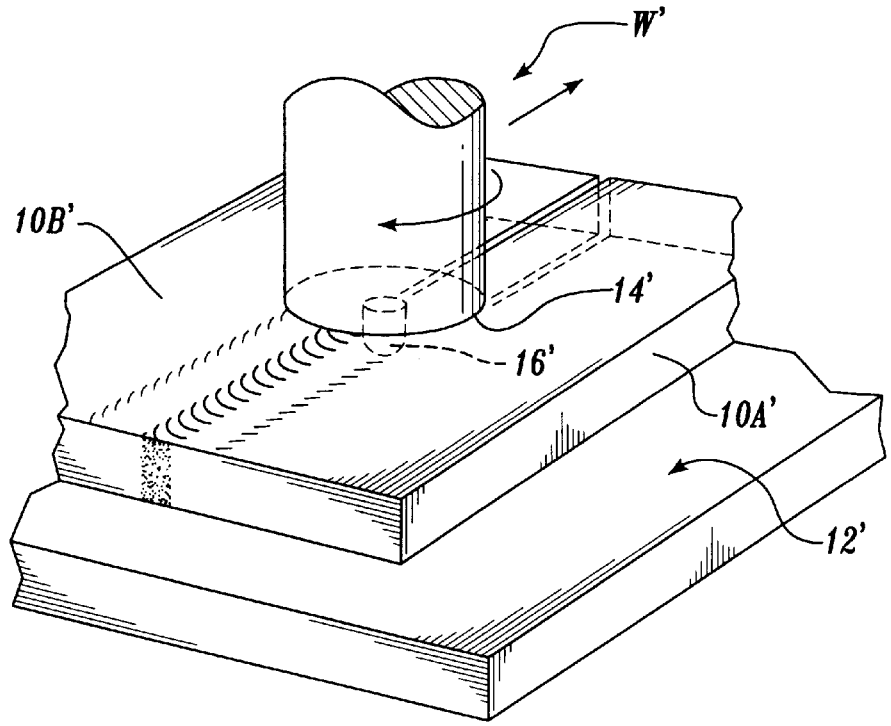
FIG. 1A is a schematic diagram of a prior art friction stir welding apparatus.
Figure 1B:
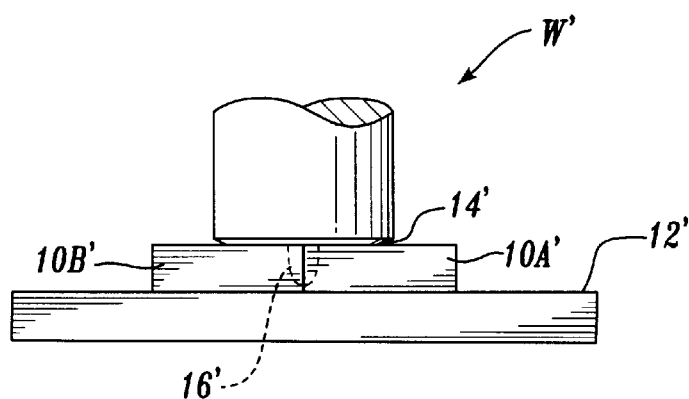
FIG. 1B is a schematic end view showing a prior art friction stir welding tool in use.
Figure 2:
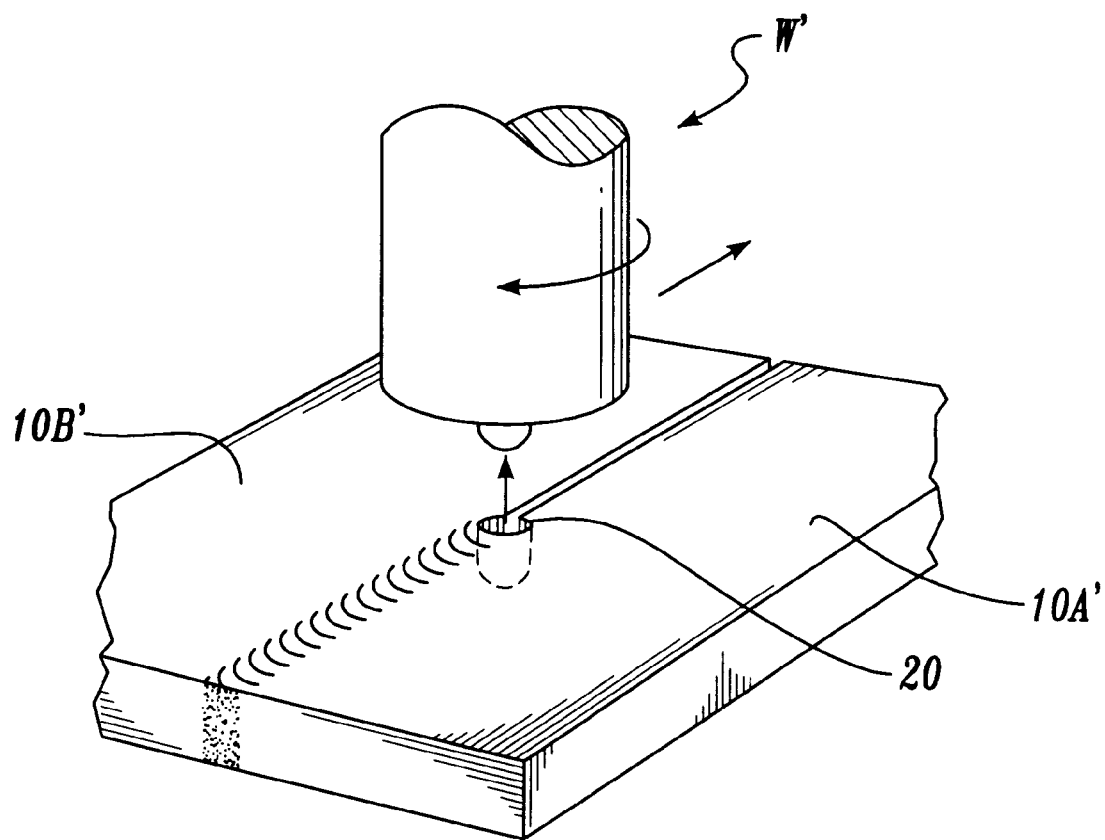
FIG. 2 schematically illustrates an in-process exit hole left from ending a friction stir weld prematurely.

The following description describes the present invention in the context of repairing a void found in a friction stir weld in an aluminum alloy. It should be understood that the methods of the present invention are equally applicable for repairing other anomalies found in an aluminum alloy, such as voids in welds produced by fusion welding or voids found in aluminum alloy workpieces themselves.

Various anomalies in a friction stir weld can be detected by visual inspection during or at the completion of the weld, and by radiographic inspection after the weld is completed. When a circular void or an in-process exit hole is found in an aluminum alloy, it must be repaired. In accordance with the present invention, a plug of the same composition or compatible with the parent metal is contoured to be generally fitted into the void. It is not necessary that the plug material is the same as the parent metal. In certain instances, it may be more advantageous to use a compatible material with better flow characteristics to achieve a high quality reweld. For example, use of a 2291-T6 plug to repair a 2195-T8 weld has been found successful in forming a reweld of more consistent properties. Furthermore, it is not necessary to machine the plug to the precise shape of the void, but the plug should be fabricated to provide enough filler material for rewelding and filling the void. Preferably, the plug, when positioned in the void, projects above and beyond a surface of the weld metal to ensure that there will be sufficient filler material. It has been found that a projection of about 0.01 inch above a weld surface is satisfactory for this purpose.

After the plug is formed, it is positioned into the void. After the plug is positioned in the void, the filler material is friction stir welded over and through in order to repair and fill the void.

One way of friction stir welding over the filler material is to plunge a friction stir welding tool into the weld adjacent the void, preferably in an area free of the void. The pin, when plunging into the parent metal, displaces some parent material. When the pin is plunged too close to the void, the material displaced by the pin tends to dislodge the filler material from the void. Thus, rewelding is preferably started at a point sufficiently distant from the void. Plunging the friction stir welding pin into the weld about one inch away from the edge of the void has been found satisfactory for this purpose. From that point, the friction stir welding tool is traversed over and through the plug to reweld and fill the void. While the tool progresses, the filler material is trapped in place by the tool shoulder.

Various parameters associated with friction stir welding, such as spindle speed, rotation, and tool geometry may be changed to produce a sufficiently strong repaired section. In most aluminum alloys, the parameter need not be changed (for example, 2219 Al). However, for the more difficult-to-repair alloys (for example, 2195 Al-Li and 7000 series Al), preferably, a pin with a larger diameter is used, and thus, spindle and travel speed are adjusted accordingly.

In order not to create another in-process exit hole, the friction stir welding tool is traversed over the existing weld all the way to the end of the weld. This is true also for repairing anomalies in aluminum workpieces themselves. In the latter situation, the tool is traversed until it reaches an edge of the workpiece, to avoid creating in-process exit holes.

It should be noted that the present method is not directly applicable for filling a termination exit hole left at the completion of friction stir welding a continuous or a circumferential surface such as a dome or a cylinder. These surfaces do not have edges and thus do require that the friction stir welding tool be retracted from the weld path at one point. The retraction necessarily leaves an exit hole on the weld that remains unfilled.

Figure 3A:
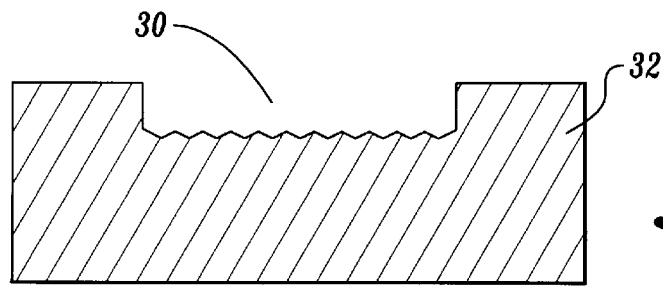
FIGS. 3A–3C schematically illustrate a method for repairing a longitudinal void according to a preferred embodiment of the present invention.
Figure 3B:
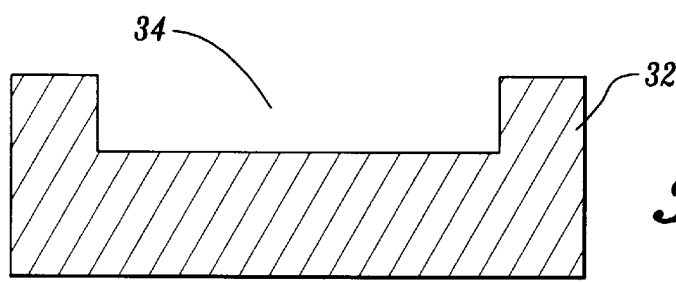
Figure 3C:
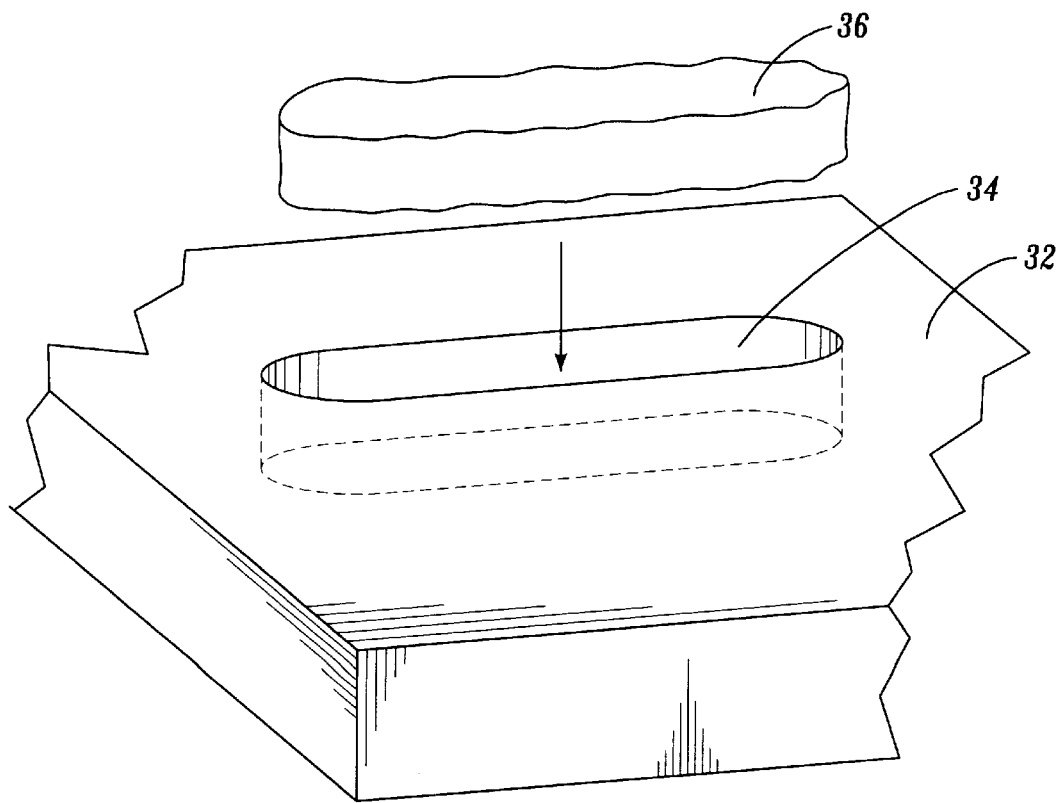

FIGS. 3A–3C schematically illustrate a method for repairing a surface or a subsurface longitudinal void in accordance with the present invention. FIG. 3A illustrates a surface longitudinal void 30 in an aluminum weld 32. Referring to FIG. 3B, surface longitudinal void 30 is removed by machining a trough 34 in weld 32. Trough 34 can be machined using a standard mill bit, for example, a 0.125 inch two-flute cutter. Referring to FIG. 3C, a strip 36 of filler material of the same composition or compatible with the parent metal of weld 32 is contoured generally to the length, width, and depth of trough 34. As before, strip 36 need not be machined precisely to the shape of trough 34, but is fabricated to provide filler material sufficient for rewelding and filling trough 34. Preferably, strip 36 when positioned in trough 34 projects above and beyond a surface of weld 32, for example, roughly about 0.01 inch, to ensure that there will be sufficient filler material. After the strip is formed, it is positioned into the trough. The filler material is then friction stir welded over and through in order to repair and fill the trough, in the same manner as discussed above with respect to repairing in-process exit holes or circular voids.

The methods described above, with respect to both circular voids or in-process exit holes and longitudinal voids, repair the voids and produce a defect-free weld without significant loss in mechanical and metallurgical properties and with an excellent aesthetic appearance. While the methods of the invention are applicable to any friction stir weld in an aluminum alloy, the invention is also applicable to repairing welds made by a fusion welding process. Furthermore, the methods are especially useful for repairing workpieces made of nonweldable materials that are difficult to repair, such as Al-Li 2195.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method to repair a void in an aluminum alloy, the method comprising:

(a) fabricating filler material to a form to be fitted into the void;

(b) positioning the filler material in the void; and (c) friction stir welding over the filler material.

2. The method of claim 1, wherein the filler material when inserted in the void projects above and beyond a surface of the aluminum alloy.

3. The method of claim 1, wherein a friction stir welding tool is initially plunged into an area of the aluminum alloy free of voids adjacent the void and is traversed through the filler metal.

4. The method of claim 3, wherein the area of the aluminum alloy free of the void comprises a weld formed by friction stir welding or fusion welding.

5. The method of claim 4, wherein the void is an in-process exit hole left during friction stir welding.

6. The method of claim 1, wherein the void is longitudinal.

7. The method of claim 6, wherein the aluminum alloy is machined to provide a trough that subsumes the longitudinal void.

* * * * *